Nov. 10, 1942.   C. I. BRADFORD   2,301,192
MEASURING INSTRUMENT
Filed May 27, 1939   4 Sheets-Sheet 1

INVENTOR.
COLIN IRVING BRADFORD
ATTORNEY.

Nov. 10, 1942.   C. I. BRADFORD   2,301,192
MEASURING INSTRUMENT
Filed May 27, 1939   4 Sheets-Sheet 2

INVENTOR.
COLIN IRVING BRADFORD
BY
ATTORNEYS.

Nov. 10, 1942.        C. I. BRADFORD         2,301,192
                  MEASURING INSTRUMENT
              Filed May 27, 1939      4 Sheets-Sheet 3

INVENTOR.
COLIN IRVING BRADFORD
BY
ATTORNEYS.

FIG. 12

Patented Nov. 10, 1942

2,301,192

UNITED STATES PATENT OFFICE 2,301,192

MEASURING INSTRUMENT

Colin Irving Bradford, Stratford, Conn., assignor to Remington Arms Company, Inc., a corporation of Delaware Application May 27, 1939, Serial No. 276,167

10 Claims. (Cl. 161—15)

This invention relates to an apparatus for measuring time intervals and particularly intervals that are extremely short, using a ballistic galvanometer or other instantaneous charge measuring device as the indicating instrument.

The accurate measurement of short time intervals is desired and necessary in many precision devices. As an example thereof, the measurement of the flight of a projectile through the barrel or externally of the barrel occupies a very short space of time. The accurate measurement of time intervals is also necessary in devices such as instruments used for sounding purposes to determine the depth of the ocean.

As a still further example of the miscellaneous applications, the measurement of the time of operation of relays and circuit breakers, the induction time in blasting caps, the speed of photoflash lamps, the blow-out time of fuses, camera shutter speeds, and in fact any short time intervals from which an electrical pulse can be obtained at the beginning and end of the interval. It is also adaptable for use in a binaural sound locator wherein the very small time interval existing between the arrival of a vibratory impulse at closely spaced points will indicate the direction of the impulse.

The basic requirements of any measuring instrument are accuracy, ease of operation, and portability. As an example, the shortcomings of the Boulenge (illustrated in Du Pont 1,357,281) chronograph (the chronograph most widely used at present for determination of projectile velocity) in these three respects have been appreciated.

For measurements of average velocity over 50 to 150 feet with corresponding times of from 0.025 to 0.150 second the accuracy of the Boulenge chronograph is good. For velocities over short ranges and for barrel time with times between 0.002 and 0.040 second, the accuracy of this instrument is not all that is desired. As an example of this, take a case with a disjunction of 306.3 mm. A variation of plus or minus of 0.5 mm. in the mark on the rod represents an uncertainty of 0.0004 second in a reading of 0.002 second or 20 per cent uncertainty in the measurements. This degree of inaccuracy is intolerable in exact measurements and may well be greater than the difference between two samples and so obscure the results.

The Boulenge chronograph is not portable and requires a heavy foundation for installation. It also requires numerous operations in a time determination therewith.

This invention has for an object the development of an accurate instrument for measuring short time intervals. Another object is to provide a chronoscope which is portable, direct reading, and adaptable to the accurate measurements of time intervals such as the barrel time of a projectile and the remaining velocities of the projectile over long ranges. A still further object is the development of a versatile instrument which will have general use for the measurement of short time intervals.

Another object of this invention is to provide an indicating device which may be readily calibrated so as to be direct reading. The deflection of the ballistic galvanometer in this invention bears a direct relation to time. Another object of the invention is to provide a compensating means for the galvanometer itself to eliminate the error arising through current flow in the galvanometer. Still another object of the invention is to provide a protective means to shut off the flow of current in case it is not discontinued by the operation of the device itself. The device also is automatically reset for the next operation regardless of the interval between reception of impulses.

It has been found that a ballistic galvanometer constituting a part of a suitable electrical circuit arrangement (with proper adjustment of current and voltage) can be used to indicate, by direct reading, time intervals of the order of a few thousandths of a second. In its simplest form the galvanometer forms a part of a circuit, which is closed at the beginning of the time interval. While the current in the circuit reaches a maximum almost instantaneously upon closing of the circuit, the needle of the inertia galvanometer, due to the inertia of the instrument, moves slowly toward an indication corresponding to the current intensity but does not reach or even closely approach this indication. As a result, the extent of movement of the galvanometer needle is a measure of the time during which the circuit is closed, and the galvanometer and its circuit arrangement therefore serve as an accurate chronoscope. It is evident, however, that any instantaneous charge indicating means of sufficient accuracy can be used.

Essentially, the chronoscope consists of a simple series electrical circuit including a battery, a voltmeter, a switch which closes at the beginning of the time interval to be measured, and a switch which opens at the end of the time interval. The operation of this circuit applies the battery voltage to the voltmeter as a pulse which lasts throughout the time interval being measured. As a result, the meter swings up scale, and the maximum deflection is directly proportional to the length of the interval.

From the following description, in which are disclosed certain embodiments of the invention as well as details of a means for carrying out the invention, it will be apparent how the foregoing objects and related ends are accomplished. The written description is amplified by the accompanying drawings, in which:

Figures 1, 4, 5:
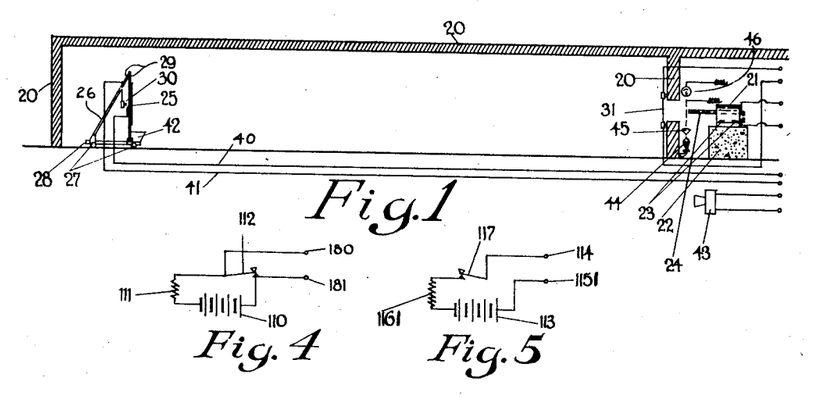
Fig. 1 is a schematic drawing of a ballistic range which shows several devices for indicating the time at which a projectile is at particular points in its flight.
Fig. 4 is a circuit arrangement indicating how a potential may be applied to a circuit by opening a switch therein.
Fig. 5 is a circuit arrangement showing how a potential may be applied to a circuit by closing a switch therein.

Referring now to Fig. 1 which shows merely by way of example one manner of using the invention, the numeral 20 indicates the walls and roof of a ballistic range. In the firing mechanism there is located a breech mechanism 21 which is bolted to a solid base 22 by means of bolts 23, in order to obtain a firm mounting for the barrel 24. At the other end of the range there is located a target plate 25 against which the projectile, fired from the barrel 24, is directed. The aforementioned target plate 25 is mounted on a movable carriage generally indicated at 26. This carriage has wheels 27 supporting a base 28 upon which is mounted an easel-like support 29 for the target plate. Located back of the target plate is a disjunctor contact 30 of conventional design. A conventional muzzle wire 31 is shown stretched across the path of the bullet. Since muzzle wires are very fine, they are usually located a short distance in front of the muzzle in order that the rush of gases from the barrel will have decreased to an intensity insufficient to break the wire when they come in contact with it.

Figures 2, 3:
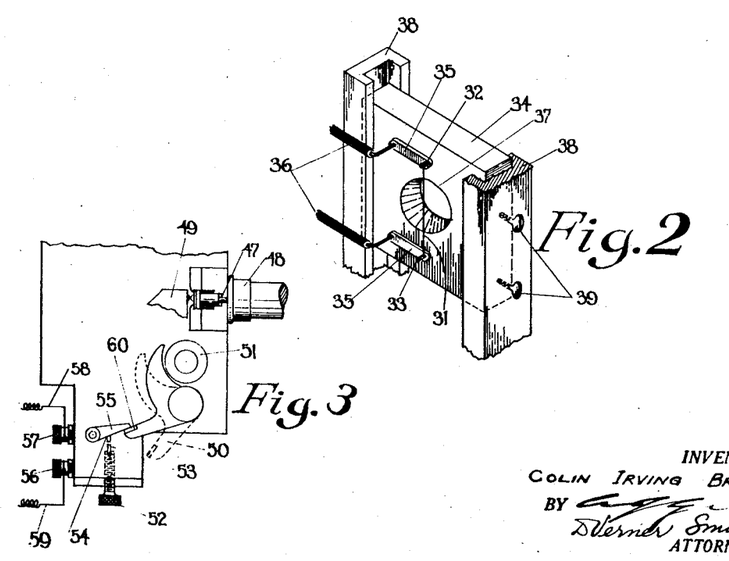
Fig. 2 is an isometric view of an unbroken muzzle wire and its associated apparatus.
Fig. 3 shows a device for indicating the time of firing or the start of a projectile on its flight.

The muzzle wire mounting is shown in more detail in Fig. 2, in which the muzzle wire 31 is stretched between binding posts 32 and 33. These binding posts are mounted in a bulletproof shield 34, usually of steel, and are connected by bars of copper or similarly conducting material 35 to lead in wires 36. The muzzle wire, binding posts, bars and lead wires form a part of the electrical circuit which is broken when the bullet severs the muzzle wire. The parts of this circuit enumerated above are of course electrically insulated from the protective plate 34. While the bullet aperture 37 in this plate may be of any desired shape, it is advantageous to make it conical with the flaring end toward the muzzle wire. In order to accommodate the different barrels and barrel mountings, it is customary to slidably mount the plate 34 in grooved pieces 38 so that a vertical adjustment may be obtained. Set screws 39 are utilized to clamp the shield 34 in any desired position.

The bullets striking the target plate 25 cause a separation of a contact on part 25 from contact 30, which parts make up the disjunctor. The part 30 is made of metal and is suspended pendulum-like against the part 25 in normal position. The force of impact of the projectile on the target plate causes a jar sufficient to separate the two parts, thereby breaking the electrical circuit of which the wires 40 and 41, which connect with the parts 25 and 30 respectively, form a part. A trap or trough 42 is disposed beneath the target plate to receive the fragments of the shattered bullet.

Referring again to Fig. 1, a microphone 43 may be utilized for indicating the time at which the bullet strikes the target plate, and in this arrangement the sound of the bullet striking the target plate when picked up by the microphone causes an electrical impulse to travel through the circuit of which the microphone is a part. This arrangement is especially desirable in measuring long flights as the velocity remaining after a long flight (for example, one thousand yards). An aluminum plate to be struck or pierced by the projectile works very satisfactorily, the sound of the impact being readily picked up by a microphone.

Also illustrated in Fig. 1 is a photoelectric cell device in which a source of illumination 44 (usually a conventional electric light bulb suitably mounted) has its rays focused into a beam by lens 45. The beam falls upon a light responsive electrical device 46 such as a well known photoelectric cell. The bullet passing through the beam of light falling on the light responsive element of the tube 46 causes the amount of light to be definitely diminished, and the resultant variations in light intensity cause an electric impulse to travel through the circuit of which the photo-electric cell is a part. Obviously such a device can be located at any desired place along the trajectory of the projectile, and can also be utilized as an indicator at the target plate.

From the above description it will be apparent that it is comparatively easy to secure an indication of the time at which a bullet leaves the gun barrel and when it reaches the target. It is much more difficult to secure an indication of the time at which the bullet starts to move. This is frequently accomplished by a special device of some sort built into the breech mechanism, and one such device is illustrated in Fig. 3, in which the firing pin is indicated at 47. A cartridge 48 is shown in position in front of the firing pin. All unnecessary parts of the breech mechanism have been omitted in this figure in the interest of clarity. Connected with the hammer 49 is a pivoted lever 50. A stop 51 limits the movements of this lever 50. When the firing mechanism is cocked the lever 50 assumes the position indicated in the dotted lines. When the mechanism is fired the lever 50 moves to its solid line position against the stop 51. A set screw 52 carries a point 53 adapted to contact with another point 54 mounted on a spring actuated lever 55. By suitable adjustment of the screw 52 the lever 50 can be caused to separate the parts 53 and 54 at the instant that the hammer 49 strikes the firing pin 47. This separation causes a breaking of the circuit of which the pin 52 and the lever 55 are a part. The lever 55 by reason of a spring (not shown) is normally forced against the screw 52. They are connected to the binding posts 56 and 57. Wires 59 and 58 are connected to the said binding posts. A base of replaceable wear-absorbing material 60 is located at the end of the lever 50 where it strikes the lever 55 in the separation movement. Separation of the pins 53 and 54 as a result of the lever 55 being raised when struck by the part 60 in its upward movement simultaneously with the striking of the firing pin 47 with the hammer 49 causes a breaking of the electrical circuit, of which the wire 58, the binding posts 57, the lever 55, the pin 54, the pin 53, the screw 52, the binding post 56 and the wire 59 constitute parts, indicates the time of the firing of the projectile.

There are also many other ways in which indications of two events, the time separating which is to be measured, can be translated into electrical energy and the invention will operate with any of these. As one of the many examples thereof, two disjunctors of the general type of 25 and 30 (Fig. 1) may be used which are sensitive to sound waves, the sound vibrations causing separation of 25 from 30.

Theory

General equations for a ballistic galvanometer show that the angle of deflection, $\theta$, is directly proportional to the quantity of electricity, $Q$, passing through the instrument. By allowing $k$ to include all of the instrument constants, the equation $$\theta = kQ$$

may represent this relation (see "Electricity and Magnetism" by S. G. Starling, page 253).

When a galvanometer is used to indicate a time interval, for example as a chronoscope, a circuit is closed at the beginning of the time interval (to be measured), allowing a current, $I$, to flow through the galvanometer. At the end of the time interval (being measured) the circuit is opened. During the interval $T$ that the current flows, the equation $$Q = IT$$

holds, and the resulting galvanometer deflection will be $$\theta = kIT$$

If $k$ and $I$ are known, the time interval can be determined because $$T = \frac{\theta}{kI}$$

This constant, $k$, can readily be determined. If a condenser of capacity $C_c$ is charged to a potential, $V$, the charge equals $C_c V$ or $$Q = C_c V$$

If the condenser is then discharged through the galvanometer and the deflection $D$ observed, it follows that $$D = kC_c V \text{ or } k = \frac{D}{C_c V}$$

Figures 7, 8, 9:
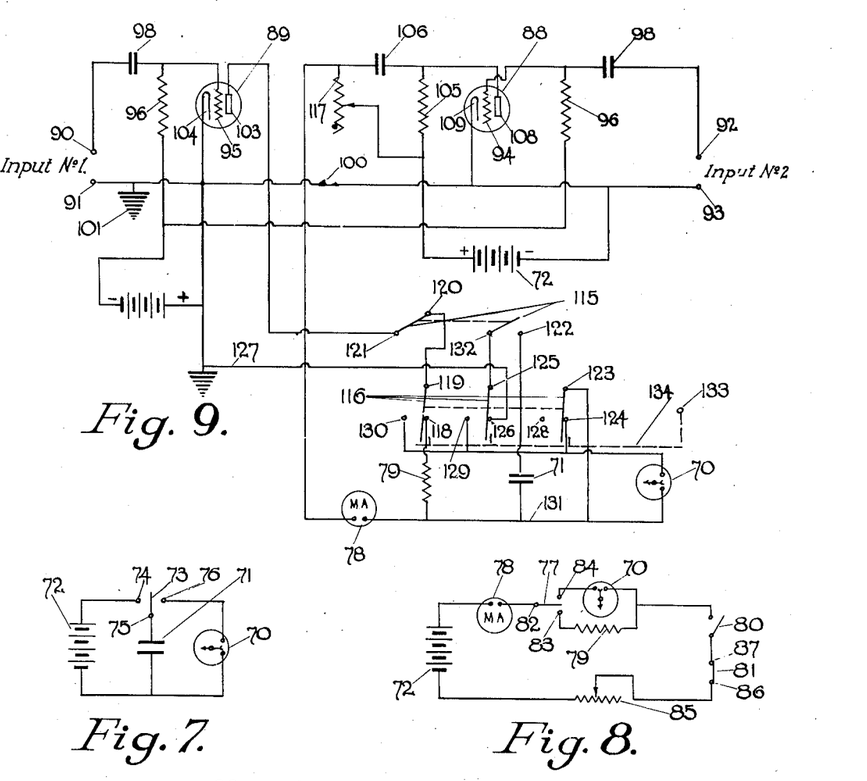
Fig. 7 is a circuit arrangement for determining the constants of a galvanometer.
Fig. 8 is a simple circuit arrangement whereby a galvanometer circuit may be adjusted to indicate values on particular portions of its scale and to be used as the indicator in a chronograph system.
Fig. 9 is a circuit arrangement by which (1) the constants of a galvanometer can be determined, (2) the galvanometer adjusted (or calibrated), and (3) the galvanometer is used as the indicator in a time interval measuring system. This circuit arrangement is a combination of the circuit arrangements shown in Fig. 6, 7 and 8.

A circuit arrangement for making this determination is shown in Fig. 7 where 70 indicates a galvanometer and 71 a condenser, and 72 the battery or other source of current. A switching lever 73 is swung to the left to complete the battery condenser circuit by joining the points 74 and 75 during the charging of the condenser. When the condenser is charged the switching lever 73 is swung to the right to close the condenser-galvanometer circuit through the points 75 and 76, to discharge the condenser. The deflection, $D$, may be observed when the condenser is discharged through the galvanometer.

The current, $I$, can be determined by steady state measurements. A circuit arrangement suitable for such a determination is shown in Fig. 8. This circuit arrangement includes a galvanometer 70, a battery 72, a switch 77, a milliammeter 78, and a resistance 79. The circuit also includes switches 80 and 81. These switches have no function in the steady state current measurement being described. They are employed in the opening and closing of the circuit when time measurements are being made, that is, when the galvanometer is being used as a chronoscope. During the current measurement for the calibration of the galvanometer they both remain closed. The resistance 79 is equal to the resistance of the galvanometer 70. The galvanometer resistances are determined and furnished by the maker so that the setting up of the present circuit arrangement presents no difficulty. The current in amperes indicated by the milliammeter is the current, $I$, which flows through the resistance 79 when the switch 77 closes between the points 82 and 83, and this would be the same current which would flow through the galvanometer 70 if the switch 77 closed through the points 82 and 84. The steady state measurements are made through the resistance in order to protect or prevent the burning out of the galvanometer.

As will be clear from the above, since $$T = \frac{\theta}{kI}$$

and $$k = \frac{D}{C_v V}$$

then $$T\theta = \frac{C_c V}{ID}$$

By letting $$\frac{C_c V}{ID} = K$$

there is obtained the multiplying factor to convert the deflections $\theta$ into time, $T$. Obviously, it would be convenient for $K$ to equal some integer, and in order to secure this result a variable resistance 85 may be inserted in the circuit in series. By means of this resistance 85 the current $I$ can be adjusted to the desired value of $$I = \frac{C_c V}{KD}$$

In this way the range of the instrument may be varied over wide limits.

Operation

A simple circuit arrangement for utilizing a galvanometer as a chronoscope is that shown in Fig. 8 and described above. When measuring time intervals the normal arrangement is for one of the switches 80 and 81 to be opened and the other closed. At the beginning of the time interval to be measured the open switch is closed and at the end of the time interval one of the switches is opened. The current flowing through the circuit during the time it was closed produces a deflection of the galvanometer needle which corresponds to a time interval, as indicated in the discussion set out above under the heading of "Theory." As a specific example of the operation, the disjunctor 25, 30 may act as the switch 81. In this arrangement its contacts 25 and 30 may be connected in the circuit arrangement at the points 86 and 87, respectively. The impact of the projectile on the target plate causes separation of the disjunctor parts, and as a result, an opening of the switch 81.

Any suitable means may be used for closing the switch 80 at the beginning of the time interval to be measured.

When the time intervals to be measured vary between 0.001 and 0.1 second, it is advisable to resort to electronic tubes to perform the function of the switches 80 and 81, in order to reduce the switching time and minimize this source of error. Electronic tubes have the advantage that they can be made to start and stop conducting as desired through the application of a positive or negative pulse, or through the opening or closing of a circuit.

Figure 6:
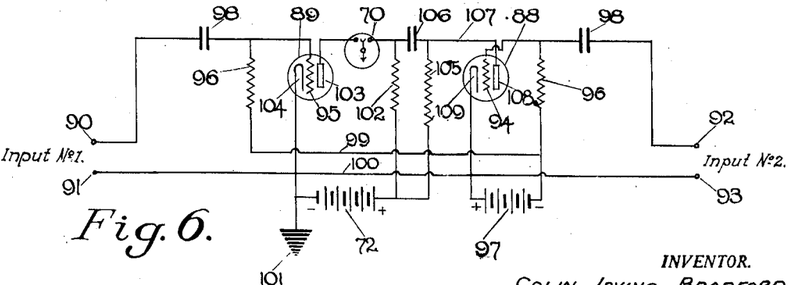
Fig. 6 is a circuit arrangement whereby a galvanometer may be use as the indicator in the chronograph system.

Such a circuit arrangement (that is, an arrangement wherein the switching operation is performed by electronic tubes) is shown in Fig. 6. The galvanometer is at 70 and the electronic tubes (in this instance the gas filled type commonly called thyratrons) at 88 and 89. The operation of the circuit will be readily apparent. When no voltages are applied to the inputs (input 1 having terminals 90 and 91 and input 2 having terminals 92 and 93), no current flows through the tubes 88 and 89 because of the negative voltage applied to the grids 94 and 95, through the resistances 96 from the battery 97.

At the beginning of the time interval to be measured, a positive voltage with respect to the ground is applied at input 1 across the terminals 90 and 91. The condenser 98 (at the left) charges through resistance 96, line 99, battery 97, line 100, (which is grounded at 101, and applies a positive potential to the grid 95 of the tube 89 sufficient to start conduction in the anode circuit. As a result, current flows from the battery 72 through the resistance 102, the galvanometer 70, plate 103, cathode 104, back to the battery 72. Simultaneously the voltage drop across the resistance 102, which for convenience of explanation equals $$IR_{102} = E_{102}$$

(I being the current through the galvanometer) is applied to resistance 105 and the condenser 106 in series, and charges the condenser 106 up to the voltage $E_{102}$.

At the end of the interval being measured, a positive voltage is applied at input 2 across terminals 92 and 93, which starts conduction in the tube 88. This takes place in a manner similar to that of tube 89 when an impulse was applied thereto. The grid 94 becomes positive due to the potential applied thereto through terminal 92, condenser 98, resistance 96, battery 97, line 100, back to terminal 93. The condenser 106 discharges through line 107, tube 88, line 100, the battery 72, and the resistance 102 back to the condenser 106. This additional current flowing through the resistance 102 increases the voltage drop thereacross sufficient to make the anode 103 of the tube 89 momentarily negative with respect to its cathode 104 because tube 89 is connected across resistance 102 or in circuit therewith. When the potential of the anode of a gas filled tube which is in a conducting condition is decreased below a certain critical value, the tube becomes non-conducting.

This can be shown by the following equations:
The anode voltage on the tube 89 when conducting is $$E_{89c} = E_{72} - IR_{102}$$

$IR_{102}$ being the potential drop across resistance 102 and the condenser 106 charges to potential $IR_{102}$.

The anode voltage on the tube 89 during extinction at the moment the condenser discharges is $$E_{89x} = (E_{72} - IR_{102}) - I_{106}R_{102}$$

where $I_{106}$ is the current from the condenser 106 which, as just previously shown also passes through resistance 102. The tube 89 remained conducting with the potential drop across 102 due to the current flow in said circuit, but as can be seen the additional current of the condenser charge further causes a potential drop which is sufficient to depress the anode voltage below the critical value necessary for the tube to remain conducting. Therefore, $$E_{89x} = E_{89c} - I_{106}R_{102}$$

the term $I_{106}R_{102}$ representing the potential which drives the anode of the tube 89 negative.

Since the pulse in the grid circuit has subsided, the tube 89 becomes non-conducting and the current through the galvanometer drops to zero. The flow of current through the tube 88 is as follows: the positive side of battery 72, resistance 105, line 107, anode 108, cathode 109, line 100, to the negative side of battery 72. Resistance 105 may be made sufficiently high so that the potential drop across it will depress the voltage on tube 88 below the critical value for it to remain conducting and therefore as the grid has resumed its negative bias the current flow will cease. It is apparent therefore that the circuit can be made automatically resetting and ready for a repetition of the sequence of operation.

The operating inputs discussed above as input 1 and input 2 can be energized in any suitable manner, as for example, by the opening of a switch. A circuit arrangement indicating one means for accomplishing this is shown in Fig. 4, in which a circuit comprises the battery 110, the resistance 111 and a normally closed switch 112. Opening of this switch allows the voltage of the battery to be impressed across the terminals 180 and 181 which may be connected to the terminals 90 and 91 or 92 and 93 in Fig. 6. Suitable means for opening the switch may be adopted to suit the specific occasion, for example, the disjunctor 25, 30 of Figs. 1 and 2 may constitute the normally closed switch. The same is true of the muzzle wire 31 of Figs. 1 and 2 and the breech switch device 53, 54 disclosed in detail in Fig. 3. The microphone 43 of Fig. 1 and the photo-electric cell of Fig. 1 may likewise supply the requisite impulse in a well-known or obvious manner.

If desired, the previously described input may be supplied by the closing of a switch instead of the opening of a switch, previously described in connection with Fig. 4. This arrangement, whereby the closing of a switch furnishes the input, will be clear from Fig. 5, in which a suitable circuit arrangement is disclosed. In that figure a battery 113 supplies a voltage to the terminals 114 and 1151 through a resistance 1161 and the normally open switch 117.

It is of course inconvenient to maintain separate circuit arrangements for calibrating, adjusting and using the galvanometer, and for this reason the circuit arrangements of Figs. 6, 7 and 8 are preferably included in a single circuit arrangement constituting the embodiment of the invention disclosed in Fig. 9.

For a determination of the current and adjustment of the same to the desired value, the switches 115 and 116 are set at the position shown in Fig. 9. With the circuit arrangements set in this manner, the circuit arrangement of Fig. 8 is in operation for the determination and adjustment of the circuit by means of the variable resistance 117. In this circuit arrangement the current flows from the positive side of battery 72 through resistance 117, milliammeter 78, resistance 79, switch contact 118, terminal 119, terminal 120, contact 121, tube 89, line 100, back to negative side of battery 72. The resistance 79 is equal to the resistance of the galvanometer as in Fig. 8. The resistance 117 is similar to resistance 102 of Fig. 6 except that it may be made variable to facilitate adjustment and is so shown. The tube 89 has been rendered conducting before the measurement is made by operating the circuit breaking means at 90 and 91 manually, applying a positive potential to grid 95.

In Fig. 9 with the switch 115 set in the opposite direction from that shown, i. e. with the contact 121 disconnected from the terminal 120 and the right hand switch blade connected to terminal 122 and with the switch 116 set at the position shown, i. e. with the terminal 123 connected to terminal 124, the terminal 125 connected with terminal 126, and the terminal 119 connected to the terminal 118, the circuit arrangement corresponds to Fig. 7 and is ready for the charging of the condenser 71. The current flows from the positive side of the battery 72 to resistance 117 through milliammeter 78 to condenser 71, contact 122, terminal 132, terminal 125, terminal 126, line 127, line 100, back to the negative side of battery 72. As a result, the condenser 71 charges to a potential 72.

The switch 116 is now thrown in the opposite direction, i. e. to say the terminal 123 is connected with the terminal 128, and the terminal 119 connected with the terminal 130. With this setting the condenser 71 and galvanometer 70 are in series in the same circuit and the condenser discharges through the galvanometer giving the desired calibrating reading. This circuit may be traced as follows: condenser 71, line 131, galvanometer 70, terminal 129, terminal 125, terminal 132, terminal 122, and back to the condenser 71.

When using the circuit of Fig. 9 to make chronoscopic determinations, the switch 115 is set in the position shown and switch 116 is set in the position opposite from that shown, namely with the terminal 123 and dead-point 128 connected, terminals 125 and 129 connected and terminals 119 and 130 connected. With this setting, the galvanometer is connected in the circuit with the tube 89.

Time measurements can be made in a manner similar to that described for Fig. 6. By returning the switch 116 to the position shown in the drawing the galvanometer motion is damped because it is shorted through switch 123, 124. A brief description will now be given of an interval measurement using the circuit in Fig. 9. A suitable impulse is impressed on input #1, which makes tube 89 conducting, charging condenser 106 through resistance 105 to the potential of the plate circuit of tube 89. This plate circuit may be traced as follows: the positive side of battery 72, resistance 117, milliammeter 78, galvanometer 70, terminal 130, terminal 119, terminal 120, terminal 121, tube 89, line 100, back to negative side of battery 72. The condenser 106 and resistance 105 are connected across resistance 117 similar to Fig. 6 and the condenser is charged to the same potential as 117. When an impulse is received from input #2 indicating the end of the interval, tube 88 becomes conducting in the manner set forth for Fig. 6, and condenser 106 discharges through tube 88, line 100, negative side battery 72, through the battery 72, resistance 117, back to the opposite plate of condenser 106. In the manner previously described for Fig. 6, the additional current through resistance 117 depresses the potential on the anode 103 of tube 89 lowering the same below the critical value and rendering the tube again non-conductive. The switch 116 may be any well known multiple switch which is diagrammatically shown with an operating means 133 and operating lever 134 shown diagrammatically in dotted lines with upstanding projections to operate the switches, for example. It is to be understood that any type of connector may be used.

Figure 10:
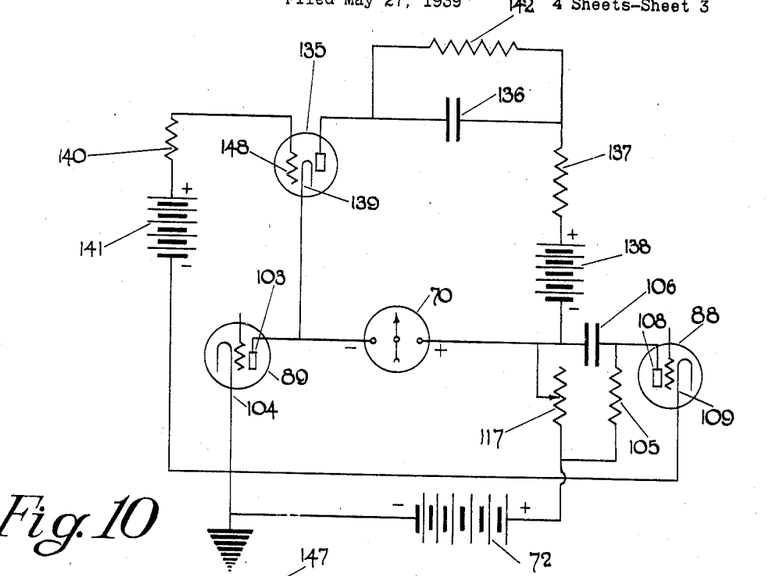
Fig. 10 is a compensating circuit per se with the essential portions of the main circuit.
Figure 12:
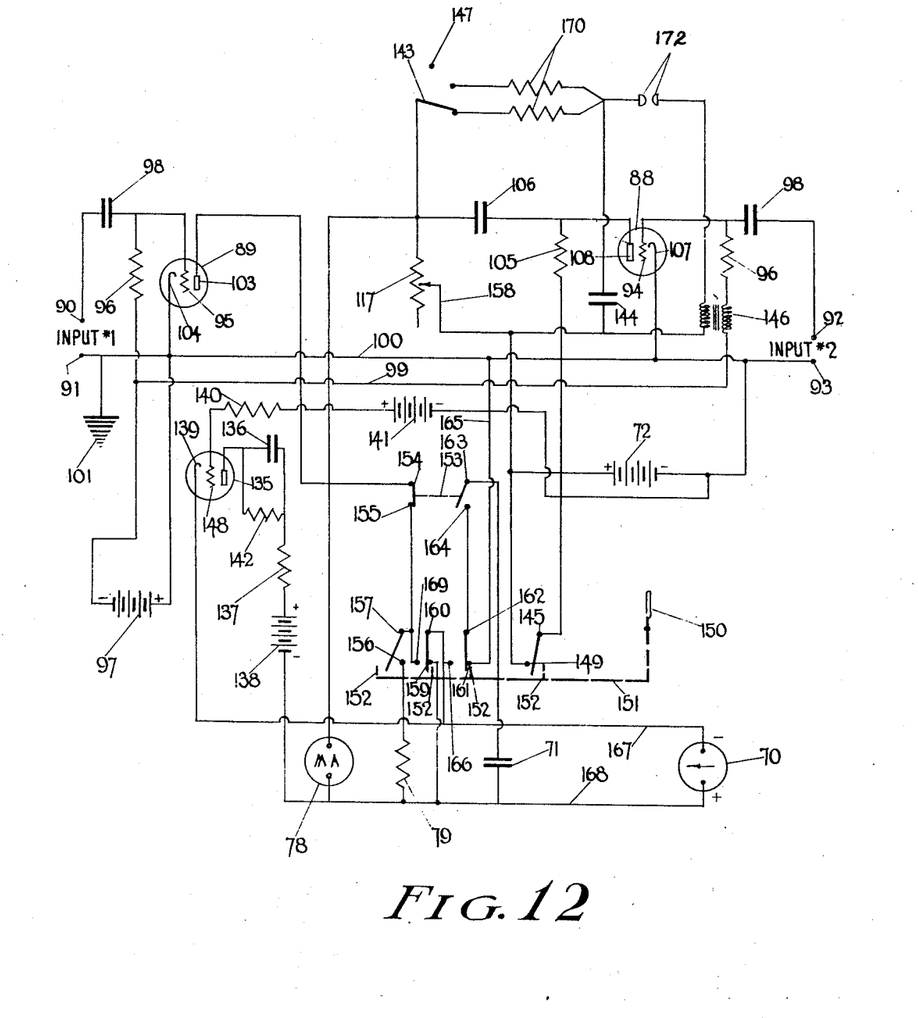
Fig. 12 is a modification of the invention similar to that of Fig. 9, with the compensating and protective circuits added thereto.

In Fig. 12 is found another modification of the invention in which compensating and protective circuits have been added to the circuit shown in Fig. 9. The compensating circuit will first be described by itself and which is shown in Fig. 10 with only the essential parts of the main circuit connected and shown therewith. When the tube 89 becomes conducting the charging current for 106 passes through the galvanometer 70 and the resistance 105, which current affects the galvanometer. This charging current varies with time, as the condenser approaches it fully charged condition. There is a constant current flowing through the galvanometer 70, tube 89 and resistance 117 and battery 72, and there is an additional current flowing through resistance 105 and through condenser 106 which is added to the galvanometer current. The effect of this charging current will cause an error in the reading of the galvanometer.

This charging current varies because $$I_c = \frac{E_I - E_T}{R_c}$$

where $I_c$ is the charging current, $E_I$ is the potential across the resistance and condenser, $E_T$ is the potential to which the condenser has arisen at that particular instance, and $R_c$ is the resistance of the charging circuit from which it can be seen that the charging current is not constant but varies from a maximum when the potential on the condenser is zero to the point where the charging is stopped.

To counteract this, the compensating circuit of Fig. 10 is impressed across the galvanometer. This compensating circuit consists of a discharge tube 135 in series with a condenser 136, resistance 137 and a suitable battery 138. The cathode 139 of the tube 135 is connected to one side (indicated —) of the galvanometer 70 and the other side of the circuit is connected to the other side of the galvanometer (indicated +), the cathode 139 being thus connected to the circuit between plate 103 of tube 89 and galvanometer 70—or, in other words, at the plate side of the galvanometer. The grid 148 of tube 135 is connected to the cathode of tube 89 in such a manner that when the tube 89 becomes conducting, the negative bias on the grid 148 of tube 135 is lowered and the tube 135 becomes conducting at the same time that tube 89 becomes conducting. The resistance 140 is placed in the circuit to limit the flow of current to the grid. The battery 141 may be placed in the grid circuit of tube 135 to better control the action thereof. The flow of current through the galvanometer 70 is from the battery 72 to the + side of the galvanometer, through the galvanometer to the plate 103. It can be seen that the flow through the compensating circuit will be in the opposite direction, from the positive side of battery 138, resistance 137, condenser 136, tube 135, back to the — side of the galvanometer. The constants of this circuit are so chosen as to exactly compensate for the charging current of 106 passing through the galvanometer. A resistance 142 is connected across the condenser 136 to serve as a leak-off for the condenser 136 making this circuit self-setting.

Figure 11:
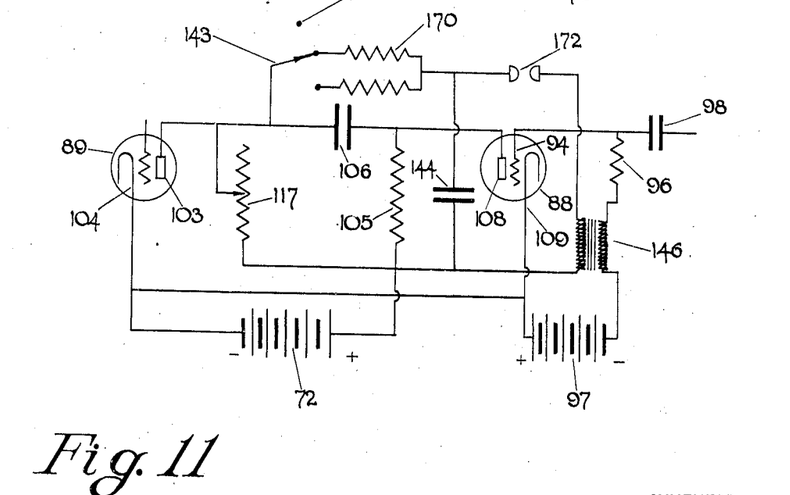
Fig. 11 is a protective circuit per se with the essential portions of the main circuit.

The protective circuit which has been added to Fig. 12 will now be described in detail. This circuit is shown per se in Fig. 11 with only the essential parts of the main circuit connected therewith. A variable resistance 170 is connected in series with a protective condenser 144 from one terminal of the condenser 106 to the other terminal of the condenser 106 through battery 72 and resistance 105. The variable resistance 170 has a dead contact 147 which renders the protective circuit inoperative. This is necessary so that the system may be calibrated as to current characteristics as previously described. If the protective circuit were not rendered inoperative, the tube 88 would turn off the tube 89 before the calibration had been completed. A discharge device 172 is connected in series with the primary of the transformer 146 across the condenser 144. The discharge device 172 may be of any suitable type such as a neon tube wherein a potential of sufficient value will render the tube conducting or cause the device to become conducting. The secondary of the transformer 146 is connected in the grid circuit of tube 88 between battery 97 and resistance 96. The condenser 106 is charged as a result of tube 89 having been rendered conducting, and concurrently condenser 144 through the variable resistance 170 is accumulating a charge which when it reaches a sufficient value will cause 172 to break down and establish a momentary impulse through the transformer 146. The latter impulse causes grid 94 to momentarily become positive and make the tube 88 conducting, which will shut off tube 89 in the same manner as though an impulse had been received at input #2. The resistance 170 has been made variable so as to vary the time in which 144 will become sufficiently charged to shut the circuit off.

Fig. 12 will now be described, in which both the compensating and protecting circuits have been incorporated. Switch 145 and 149 which is part of switch 150 has also been added to the circuit. This switch serves to positively cut off tube 88. In other respects, the device of Fig. 12 is identical to the other circuits. The key 150 operates switches 145, 149; 161, 162, 166; 159, 160, 169; and 156, 157. These switches may be operated for example by an arm 151 indicated diagrammatically by the dashed line having projections 152 to operate the switch blades. It can be seen that as the key is moved in one direction, certain of the switches will be closed and when moved in the other direction, other of the switches will be closed as will now be described. When it is desired to calibrate the circuit of Fig. 12 and determine the value of current in the galvanometer circuit, switch 153 is in the position shown in which terminals 154 and 155 are connected. The key of switch 150 is so operated that the arm 151 is moved to the right, operating to close terminals 156 and 157 only, the other projections of arm 151 being moved away from their respective switch blades. It is to be understood that the key 150 can be of any conventional type of multi-position switch or combination of switches. The circuit can then be traced as follows: positive side of battery 72, line 158, resistance 117, milliammeter 78, resistance 79, terminal 156, terminal 157, terminal 155, terminal 154, tube 89, line 100, back to the negative side of battery 72. While this determination is being made, switch 143 is placed on contact 147 so as to disconnect the protective circuit and allow the reading to be completed. Terminal 159 is connected during this to terminal 160, short circuiting the galvanometer 70.

To determine the galvanometer deflection the key 150 is left in its neutral position so that terminals 161 and 162 are connected. The switch 153 is moved in the opposite direction to that shown, so that terminals 163 and 164 are closed. The charging circuit may then be traced from the positive side of battery 72, line 158, resistance 117, milliammeter 78, condenser 71, terminal 163, terminal 164, terminal 162, terminal 161, line 165, line 100, back to the negative side of battery 72. Key 150 is then operated so that arm 151 moves to the left, connecting terminal 162 with terminal 166 and disconnecting terminal 159 from 160. The discharge circuit of condenser 71 can then be traced as follows: from the upper side of condenser 71, terminal 163, terminal 164, terminal 162, terminal 166, line 167, galvanometer 70, line 168, back to condenser 71.

After these constants have been ascertained, the system is then ready for a time interval determination. The switch 153 is placed in the position shown in the drawings wherein terminals 154 and 155 are connected. Key 150 is operated so that arm 151 moves to the left, closing terminals 162, 166, terminals 160, 169 and removing the short circuit of 160, 159 on the galvanometer. In a manner similar to Figs. 6 and 9, an impulse is received at terminals 90 and 91, rendering tube 89 conducting, the circuit being from the positive side of battery 72, line 158, resistance 117, milliammeter 78, galvanometer 70, terminal 160, terminal 169, terminal 155, terminal 154, tube 89, line 100, back to the negative side of battery 72. The condenser 106 charges in a manner similar to that previously described. As the tube 89 is rendered conducting, tube 135 also becomes conducting, the grid 148 thereof being connected through resistance 140, battery 141, negative side of battery 72, line 100, to the cathode 104 of tube 89. The plate circuit of tube 135 may be traced as follows: positive side of battery 138, resistance 137, condenser 136, tube 135, line 167, — side of galvanometer 70, + side of galvanometer 70, line 168, back to the negative side of battery 138. As was described in Fig. 10, it can be seen that the current flowing through galvanometer 70 of the compensating circuit is in the opposite direction from that flowing therein due to the conduction of tube 89. The tube 88 is rendered conducting by the impulse received at the terminals 92 and 93 at the termination of the interval. Tube 88 having been rendered conducting, condenser 106 discharges therethrough, and the additional current flowing through resistance 117 depresses the potential applied on plate 103 of tube 89, extinguishing tube 89 in the same manner as described in Figs. 6 and 9. In case the impulse is not received to render tube 88 conducting from the interval timing means, the circuit through one of the resistances 170 and switch 143 which has been placed on the resistance which will cause the protective circuit to operate at an interval greater than the interval to be timed, will be completed through protective condenser 144. When the potential in this circuit containing variable resistance 170 and condenser 144 has built up sufficiently, discharge device 172 will break down and the impulse through transformer 146 will be delivered to the grid circuit of tube 88, causing said tube to become conducting and allow condenser 106 to discharge, thereby extinguishing tube 89. The values of the resistance 170 and of the condenser 144 are so chosen that the time required to charge the same will be greater than the time interval to be measured. Upon completion of the measurement, the key 150 is released or placed in its neutral position so that the circuit is broken between contacts 145 and 149 which had previously been made when the switch arm 151 was moved to the left for time determination. This breaks the circuit through tube 88 positively at the end of the operation, making the circuit re-setting. It is to be understood that resistance 105 may also be made of such value as described for Fig. 9 so that the tube 88 will extinguish itself immediately after becoming conducting.

Also the positioning of said switch in central position will connect terminals 160 and 159, thus damping the galvanometer action.

It is seen therefore that a time interval measuring device capable of very accurate measurements which can be used for a multitude of purposes has been made possible by this invention.

The invention is not limited to the details described and illustrated but is to be construed as covering all equivalent devices falling within the scope of the appended claims.

What is claimed is:

1. In a protective circuit for an interval measuring device that comprises a main condenser and a charging circuit therefor, the combination of a protective resistance and condenser connected in series with one another and in parallel with said main condenser charging circuit, a discharge device for said protective condenser and an inductive device connected in series with one another and in parallel with said protective resistance and condenser, and means for discharging said main condenser including an electronic tube also connected to said inductive device to receive an activating impulse from said discharge device through said inductive device when the discharge device breaks down under a charge accumulated on said protective condenser, thus insuring discharge of said main condenser.

2. In an interval measuring device, the combination comprising two normally non-conducting gaseous discharge tubes, each tube including a plate, control grid and a cathode; a plate-cathode circuit for the first of said tubes including a source of energy, a first resistance and a ballistic galvanometer directly in said plate-cathode circuit; a condenser and second resistance in series therewith connected across said first resistance; a plate-cathode circuit for the second of said tubes, said second plate-cathode circuit having one side of said condenser connected to the plate, the other side of the condenser being connected through said first resistance to the cathode of said second tube; means to normally bias the control grids of the gaseous discharge tubes below that necessary for conduction of the tube; means responsive to a first impulse at the beginning of the interval to change the bias of the first tube to render the same conducting; means responsive to a second impulse at the end of the interval to change the bias of the second tube to render the same conducting, whereby the condenser will discharge through the second tube and the first resistance to depress the plate potential of the first tube and extinguish the same.

3. In an interval measuring device, the combination comprising two normally non-conducting gaseous discharge tubes, each tube including a plate, a control grid and a cathode; a plate-cathode circuit for the first of said tubes including a source of energy, a first resistance and a ballistic galvanometer directly in said plate-cathode circuit; a condenser and second resistance in series therewith connected across said first resistance; a plate-cathode circuit for the second of said tubes, said circuit having one side of said condenser connected to the plate thereof and the other side of the condenser connected through said first resistance and source of energy to the cathode of said second tube; means to normally bias the control grids of the gaseous discharge tubes below that necessary for conduction; means responsive to a first impulse at the beginning of the interval to change the bias of the first tube to render the same conducting; means responsive to a second impulse at the end of the interval to change the bias of the second tube to render the same conducting, whereby the condenser will discharge through the second tube and the first resistance to depress the plate potential of the first tube and extinguish the same.

4. In an impulse responsive device, a normally non-conducting gaseous discharge tube having a plate, control grid and cathode; a plate-cathode circuit including said plate and cathode, a source of energy, a first resistance and a ballistic galvanometer directly in said plate-cathode circuit; a condenser and a second resistance in a series circuit connected across said first resistance; means to normally bias said control grid below the potential necessary for conduction; means responsive to a first impulse to render the tube conducting; means responsive to a second impulse to discharge the condenser through the first resistance to extinguish the tube; a compensating circuit for said galvanometer including a second gaseous discharge tube having a plate, cathode and control grid; a plate-cathode circuit therefor including said plate and cathode, a condenser, a resistance, a source of energy, and said galvanometer, the cathode of the second tube being connected to the side of the galvanometer connected to the plate of the first tube so that flow of current in the compensating circuit and through the galvanometer will oppose flow through the galvanometer during conduction by the first tube to compensate for the charging current to the first condenser; and means to render the second tube conducting with the first tube.

5. In an impulse responsive device, a normally non-conducting gaseous discharge tube having a plate, control grid and cathode; a plate-cathode circuit including said plate and cathode, a source of energy, a first resistance and a ballistic galvanometer directly in said plate-cathode circuit; a condenser and a second resistance in a series circuit connected across said first resistance; means to normally bias said control grid below the potential necessary for conduction; means responsive to a first impulse to render the tube conducting; means responsive to a second impulse to discharge the condenser through the first resistance to extinguish the tube; a compensating circuit for said galvanometer including a second gaseous discharge tube having a plate, control grid and cathode; a plate-cathode circuit therefor including said plate and cathode, a condenser, a resistance, a source of energy and said galvanometer, the cathode of the second tube being connected to the plate side of the galvanometer, the constants of the compensating circuit being so chosen that the flow of current in the compensating circuit and through the galvanometer will equal and oppose the flow of current through the galvanometer due to the charging current for said condenser while the first tube is conducting; and means to render the second tube conducting with the first tube.

6. In an interval measuring device comprising two normally non-conducting gaseous discharge tubes, each tube including a plate, control grid and a cathode; a plate-cathode circuit for the first of said tubes including a source of energy, a first resistance and a ballistic galvanometer directly in said plate-cathode circuit; a condenser and second resistance in series therewith connected across said first resistance; a plate-cathode circuit for the second of said tubes, said second plate-cathode circuit having one side of said condenser connected to the plate thereof, the other side of the condenser being connected through said first resistance to the cathode of said second tube; means to normally bias the control grids of the gaseous discharge tubes below that necessary for conduction; means responsive to a first impulse to change the bias of the first tube to render the same conducting; means responsive to a second impulse to change the bias of the second tube to render the same conducting; a compensating circuit for said galvanometer including a third gaseous discharge tube having a plate, cathode and control grid; a plate-cathode circuit therefor including said plate, cathode, a second condenser, a third resistance, a second source of energy and said galvanometer, the cathode of the third tube being connected to the side of the galvanometer connected to the plate of the first tube so that flow of current in the compensating circuit and through the galvanometer will oppose the flow through the galvanometer due to conduction by the first tube to compensate for the charging current to the first condenser; and means to render the third tube conducting with the first tube.

7. In an impulse measuring device, the combination comprising two normally non-conducting gaseous discharge tubes, each tube including a plate, control grid and a cathode; a plate-cathode circuit for the first of said tubes including a source of energy, a resistance and a ballistic galvanometer directly in said plate-cathode circuit; a condenser and a second resistance in series therewith connected across said resistance; a plate-cathode circuit for the second tube, said plate-cathode circuit having one side of said condenser connected to the plate, the other side of the condenser being connected through said first resistance to the cathode of said second tube; means to normally bias the control grids of the gaseous discharge tubes below that necessary for conduction; means responsive to a first impulse to change the bias of the first tube to render the same conducting; a protective circuit to extinguish the first tube after a predetermined time including a third resistance and protective condenser connected across said first resistance, the protective condenser charging when the first tube is conducting; a discharge device connected to said protective condenser and to the control grid of the second tube to deliver an impulse thereto after said protective condenser reaches a predetermined charge.

8. In an interval measuring device comprising two normally non-conducting gaseous discharge tubes, each tube including a plate, control grid and a cathode; a plate-cathode circuit for the first of said tubes including a source of energy, a first resistance and a ballistic galvanometer directly in said plate-cathode circuit; a condenser and second resistance in series therewith connected across said first resistance; a plate-cathode circuit for the second of said tubes, said circuit including the first resistance and said condenser; means to normally bias the control grids of the first and second gaseous discharge tubes below that necessary for conduction; means responsive to a first impulse to change the bias of the first tube to render the same conducting; means responsive to a second impulse to change the bias of the second tube to render the same conducting; a compensating circuit for said galvanometer including a third gaseous discharge tube having a plate, cathode and control grid; a plate-cathode circuit therefor including said plate and cathode, a second condenser, a third resistance, a source of energy and said galvanometer, the cathode of the third tube being connected to the plate side of the galvanometer so that flow of current in the compensating circuit and through the galvanometer will oppose the flow through the galvanometer due to conduction by the first tube to compensate for charging current to the first condenser; means to render the third tube conducting with the first tube; a protective circuit to extinguish the first tube after a predetermined time, including a fourth resistance, and a protective condenser connected across said first resistance; a gaseous discharge device connected to said protective condenser and to the control grid of the second tube to deliver an impulse thereto after said predetermined time.

9. In a time interval measuring device, the combination comprising two normally non-conducting gaseous discharge tubes, each tube including a plate, cathode and control grid; a plate-cathode circuit for the first of said tubes including the plate and cathode thereof, a source of energy, a first resistance and a ballistic galvanometer directly in said circuit; a plate-cathode circuit for the second tube including the plate and cathode thereof, said condenser and said first resistance; means to normally bias the control grids to maintain the tubes non-conducting; means to change the bias on the first tube at the beginning of the interval to cause the first tube to conduct; means to change the bias on the second tube to render the same conducting so as to discharge said condenser through the first resistance and extinguish the first tube; calibrating means including a resistance equivalent to that of the galvanometer and a switch to place said resistance in the first tube plate-cathode circuit and remove the galvanometer therefrom; current measuring means for said circuit; and a calibrating condenser with switch means for controlling charging of the condenser by placing the same in the plate-cathode circuit of the first tube and then discharging the condenser across the galvanometer so as to obtain the constants of the circuit.

10. In a compensating circuit for a ballistic galvanometer measuring circuit, said measuring circuit including a gaseous discharge tube including a cathode and plate, a ballistic galvanometer and first resistance in series therewith, a second resistance and condenser in series with each other connected across said first resistance, the compensating circuit comprising a gaseous discharge tube including a cathode and plate; a plate-cathode circuit therefor including said plate, cathode, a third resistance and said galvanometer, the plate of the first tube and cathode of the second tube being connected to the same side of the galvanometer so that the flow of current through the galvanometer in one circuit will be balanced and thus compensated for by the flow through the other circuit, said compensating circuit condenser having a leak-off connected across the same, rendering the circuit self-setting.

COLIN IRVING BRADFORD.

Certificate of Correction

Patent No. 2,301,192.                                         November 10, 1942.

COLIN IRVING BRADFORD

It is hereby certified that errors appear in the printed specification of the above numbered patent requiring correction as follows: Page 1, first column, lines 20-21, for "intervals" read *interval;* page 2, first column, line 27, for "use" read *used;* page 3, second column, lines 51 and 52, for "$k=\frac{D}{C_rV}$" read $k=\frac{D}{C_eV}$; lines 54 and 55, for "$T\theta=\frac{C_eV}{ID}$" read $T=\theta\frac{C_eV}{ID}$; page 5, first column, line 15, for "a" read *the;* and second column, line 18, for "in put" read *input;* line 64, for "instance" read *instant;* and that the said Letters Patent should be read with these corrections therein that the same may conform to the record of the case in the Patent Office.

Signed and sealed this 30th day of March, A. D. 1943.

[SEAL]

HENRY VAN ARSDALE,
*Acting Commissioner of Patents.*